United States Patent [19]
Wamser et al.

[11] 3,937,783
[45] Feb. 10, 1976

[54] RECOVERY OF FLUORINE, URANIUM AND RARE EARTH METAL VALUES FROM PHOSPHORIC ACID BY-PRODUCT BRINE RAFFINATE

[75] Inventors: Christian A. Wamser, Camillus, N.Y.; Charles P. Bruen, Bernardsville, N.J.

[73] Assignee: Allied Chemical Corporation, New York, N.Y.

[22] Filed: Feb. 21, 1974

[21] Appl. No.: 444,211

[52] U.S. Cl. ............... 423/8; 423/11; 423/18; 423/21; 423/167; 423/319; 423/321 S
[51] Int. Cl.² ............... B01D 11/04; C01G 56/00
[58] Field of Search ............ 423/8, 11, 15, 18, 167, 423/21, 319, 321 S

[56] References Cited
UNITED STATES PATENTS

| | | | |
|---|---|---|---|
| 2,797,143 | 6/1957 | Arendale et al. | 423/18 X |
| 2,859,092 | 11/1958 | Bailes et al. | 423/7 |
| 2,869,979 | 1/1959 | Grinstead | 423/7 |
| 2,926,992 | 7/1960 | Stedman | 423/18 |
| 3,338,674 | 8/1967 | Daniel et al. | 423/167 X |
| 3,790,658 | 2/1974 | Fox et al. | 423/18 X |
| 3,842,155 | 10/1974 | Muller et al. | 423/18 X |

*Primary Examiner*—Benjamin R. Padgett
*Assistant Examiner*—E. A. Miller
*Attorney, Agent, or Firm*—Gerhard H. Fuchs; Jack B. Murray, Jr.

[57] ABSTRACT

A method for recovering substantially all of the fluorine and uranium values and at least 90 percent of the rare earth metal values from brine raffinate obtained as by-product in the production of phosphoric acid by the hydrochloric acid decomposition of tricalcium phosphate minerals. A basically reacting compound is added to the brine raffinate to effect a pH of at least about 9, whereby fluorine, uranium and rare earth metal values are simultaneously precipitated therefrom. These values may then be separately recovered from the precipitate by known processes.

9 Claims, 1 Drawing Figure

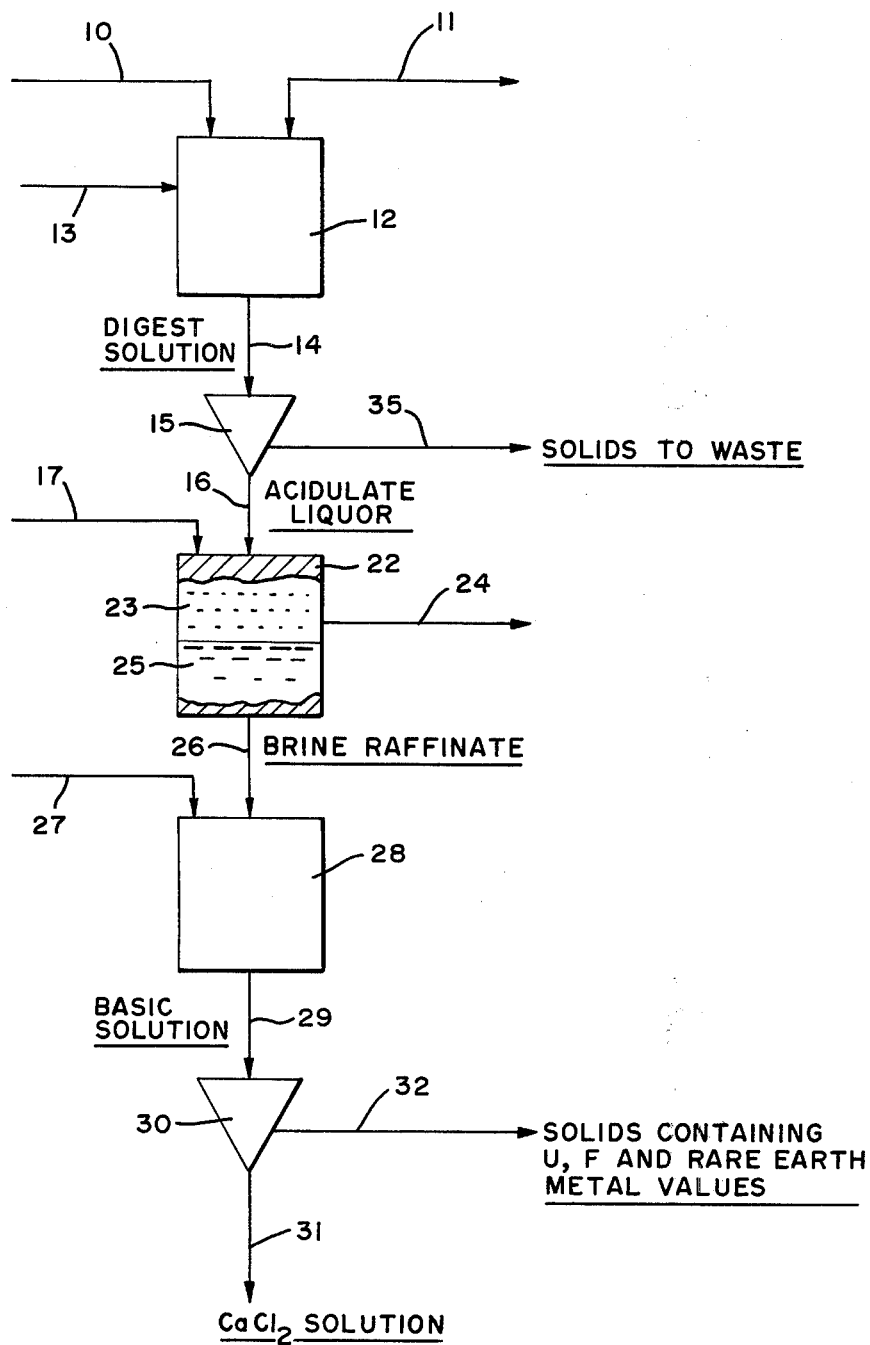

RECOVERY OF FLUORINE, URANIUM AND RARE EARTH METAL VALUES FROM PHOSPHORIC ACID BY-PRODUCT BRINE RAFFINATE

BACKGROUND OF THE INVENTION

1. Field of the Invention

This invention relates to the recovery of fluorine, uranium and rare earth metal values from waste liquors produced as a by-product in the production of phosphoric acid by the hydrochloric acid decomposition of tricalcium phosphate minerals.

2. Description of the Prior Art

The production of phosphoric acid by the hydrochloric acid decomposition of tricalcium phosphate minerals is well known in the prior art. In such a process, of which U.S. Pat. No. 2,880,063 (issued in 1959 to Baniel et al.) and U.S. Pat. No. 3,311,450 (issued in 1967 to Alon et al.) are typical, a tricalcium phosphate mineral is digested with hydrochloric acid to form a digest solution which is filtered to remove insolubles containing calcium fluoride and most of the silica from the tricalcium phosphate mineral, thereby producing a filtrate termed the aqueous acidulate liquor, which contains $CaCl_2$, $HCl$ and $H_3PO_4$ in addition to fluorine, uranium and rare earth metal values present in the tricalcium phosphate mineral treated. The acidulate liquor is contacted with a suitable organic solvent to extract $H_3PO_4$ into the organic phase, which is subsequently separated from the aqueous phase and treated to recover phosphoric acid therefrom. During the extraction operation, some additional HCl is introduced to maintain a concentration of about 2 weight percent HCl in the aqueous phase throughout the extraction to improve the efficiency of phosphoric acid transfer into the organic solvent.

The aqueous phase obtained following this separation, termed the "brine raffinate," contains essentially all of the fluorine and rare earth metal values and a portion of the uranium values initially present in the acidulate liquor. Most uranium, however, remains in the organic phase containing the $H_3PO_4$ and must be recovered therefrom subsequent to the extraction step recited above.

Discarding the brine raffinate thereby produced represents a significant loss of valuable fluorine, uranium and rare earth metal values. Uranium values, for example, upon recovery, concentration and purification are useful in serving as fuel for atomic reactors. Due to the large tonnages of tricalcium phosphate minerals which are annually produced by industry to obtain phosphoric acid, even the small concentrations of fluorine, uranium and rare earth metal values which are contained in these minerals represent a substantial source of these valuable elements in the aggregate.

SUMMARY OF THE INVENTION

According to the present invention, substantially all of the fluorine and uranium values and at least 90 percent of the rare earth metal values are recovered from tricalcium phosphate minerals by a process which comprises digesting the mineral with hydrochloric acid to form (1) a digest solution containing fluorine, uranium and rare earth metal values and (2) an insoluble residue, separating said insoluble residue from said solution, thereby producing an aqueous acidulate liquor containing fluorine, uranium and rare earth metal values, contacting said liquor with an organic solvent capable of dissolving phosphoric acid but having limited miscibility with water free of phosphoric acid to extract phosphoric acid from said liquor into the organic phase, separating said organic phase from the aqueous phase for subsequent removal of phosphoric acid from said organic phase, admixing a basically reacting compound with said separated aqueous phase to effect a pH of at least about 9, thereby forming a basic solution and precipitated solids containing fluorine, uranium and rare earth metal values, separating the precipitated solids from the basic solution and recovering the fluorine, uranium and rare earth metal values from the separated solids.

In the process of the present invention, substantially all of the fluorine and uranium values and at least 90 percent of the rare earth metal values are surprisingly and advantageously coprecipitated by the addition to the brine raffinate of a basically reacting compound in an amount sufficient to effect a pH of at least about 9, and preferably about 9 to 11, in the raffinate. In addition, precipitation of uranium values from the brine raffinate has been found not to be dependent on whether the uranium values present in the brine raffinate are in the hexavalent or tetravalent state. The present invention provides an efficient and economic recovery of valuable fluorine and uranium values and, most significantly, provides an efficient and economic recovery of the much more valuable rare earth metal values from tricalcium phosphate minerals, thus avoiding the economic penalty of discarding waste liquors produced as by-products from the production of phosphoric acid.

In addition, it has been found that from about 40 to 50% of the fluorine values initially present in the tricalcium phosphate mineral either remain in the insoluble residue as calcium fluoride following the hydrochloric acid digestion or are volatilized from the digest solution during digestion. In accordance with a specific embodiment of the present invention, the portion of the fluorine values present in the tricalcium phosphate mineral which transfers into and remains in the digest solution and which, therefore, transfers to the aqueous acidulate liquor and is recovered by the process of the present invention, may be significantly increased by providing in the digest solution an aluminum-containing compound which is soluble in the digest solution. Further, the amount of fluorine values volatilized and thus lost during digestion may be decreased by employing a digestion temperature of not greater than about 110°C., preferably about 90° to 100°C.

BRIEF DESCRIPTION OF THE DRAWING

The accompanying FIGURE is a schematic diagram of the process of the present invention.

DETAILED DESCRIPTION OF THE INVENTION

The term "tricalcium phosphate mineral" as used herein is meant to include any mineral, such as phosphate rock (e.g., apatite) which contains tricalcium phosphate and small amounts of fluorine, uranium and rare earth metal values and which reacts with hydrochloric acid to form phosphoric acid. Typical of such minerals are phosphate rock, apatite and phosphorite. If phosphate rock is used, it may be either calcined or uncalcined rock.

The tricalcium phosphate minerals treated by the process of the present invention generally contain from about 2 to 4 weight percent fluorine, 50 to 300 ppm uranium and 100 to 1,000 ppm rare earth metals, measured as the respective elements. The mineral generally contains fluorine values in the form of $Ca_5(PO_4)_3F$, and rare earth metals in the form of oxides, fluorides or phosphates. Typical of rare earth metals which may be present are yttrium, lanthanum, cerium and small amounts of gadolinum, ytterbium, europium, samarium and praseodymium. While the form which uranium takes in tricalcium phosphate minerals has not been precisely determined, uranium is generally thought to be present in both the hexavalent and tetravalent states in the form of calcium uranate or uranyl phosphate ($U^{+6}$) and calcium uranous fluoride or uranous phosphate ($U^{+4}$). Tricalcium phosphate minerals typically also contain from about 0.8 to 1.3 weight percent aluminum values as $Al_2O_3$, 0.8 to 1.5 weight percent iron values as $Fe_2O_3$; 7.0 to 9.0 weight percent silicon values as $SiO_2$, 0.1 to 0.5 weight percent $Na_2O$, 0.1 to 0.5 weight percent $K_2O$, 0.2 to 1.0 weight percent sulfur values as $SO_3$, and 3.0 to 7.0 weight percent volatile matter (i.e., water, organic carbon, carbonate carbon and nitrogen).

A typical tricalcium phosphate mineral which may be treated by the process of the present invention contains:

| | | |
|---|---|---|
| Ca values (as CaO) | 45 | weight percent |
| P values (as $P_2O_5$) | 32 | " |
| F values (as elemental F) | 3.5 | " |
| $SiO_2$ | 8.0 | " |
| $Al_2O_3$ | 1.0 | " |
| $Fe_2O_3$ | 1.3 | " |
| U values (as elemental U) | 200 | ppm |
| Yttrium values (as elemental Y) | 300 | ppm |
| Lanthanum values (as elemental La) | 70 | ppm |
| Cerium values (as elemental Ce) | 30 | ppm |

Up to about 100 ppm (as the elemental metals) of other rare earths may also be present. These include gadolinium, ytterbium, samarium, praseodymium, dysprosium, europium, lutetium, erbium and thulium. Such minerals also typically contain organic matter, as well as moisture. However, tricalcium phosphate minerals differing very considerably from that indicated either in composition or relative concentrations of components may also be satisfactorily processed.

In the process of the present invention, while any concentration of hydrochloric acid may be employed to digest the tricalcium phosphate mineral, it is preferred to employ an aqueous solution of hydrochloric acid which contains from about 20 to 37 weight percent HCl and most preferably from about 23 to 30 weight percent HCl. The amount of hydrochloric acid which is added to a tricalcium phosphate mineral to be treated is not critical, but is generally from about 100 to 110 percent of the stoichiometric amount required to react with the tricalcium phosphate content of the mineral to form phosphoric acid, and preferably from about 103 to 108 percent. The time of digestion is not critical and varies widely with the composition of the tricalcium phosphate mineral which is treated, the amount of HCl added during digestion and other factors. For example, a digestion time of from about 1 to 2 hours is required for substantially complete digestion of a tricalcium phosphate mineral containing 80 weight percent tricalcium phosphate. It has been found that volatilization of fluorine values from the digest solution may be minimized by terminating the digestion step when all the tricalcium phosphate in the mineral is reacted. Likewise, while the digestion may be performed over a wide range of temperatures, it has been found that a temperature of not greater than 110°C., and preferably about 60° to 100°C., provides a substantial decrease in the amount of fluorine values volatilized from the digest solution.

Since the hydrochloric acid digestion of a tricalcium phosphate mineral typically provides an insoluble residue in the digest solution, separation of the residue is generally necessary before the digest solution is further processed. The separation of these solids may be effected by any standard solid separation process such as filtering, centrifuging or by decanting the digest liquor. An acidulate liquor results following the removal of the insoluble residue from the digest solution. A typical acidulate liquor contains:

| | | |
|---|---|---|
| $CaCl_2$ | 27.0 | weight percent |
| $H_3PO_4$ | 12.6 | " |
| F values (as elemental F) | 0.6 | " |
| HCl | 2.0 | " |
| $AlCl_3$ | 0.7 | " |
| $FeCl_3$ | 0.8 | " |
| U values (as elemental U) | 80 | ppm |
| Yttrium values (as elemental Y) | 100 | ppm |
| Lanthanum values (as elemental La) | 20 | ppm |
| Other Rare Earths (as elemental metals) | 40 | ppm (total) |

However, it will be appreciated that the composition of such a solution may vary considerably from that indicated depending upon the composition of the original tricalcium phosphate mineral which is treated and upon the conditions of digestion of the mineral. The fluorine values in the typical acidulate liquor described above are thought to be present in the form of complex ions such as fluosilicate ($SiF_6$) and fluoaluminate (e.g., $AlF^{+2}$, $AlF_2^{+}$, etc.).

The acidulate liquor thereby obtained is contacted with a suitable organic solvent. Organic solvents which are suitable in the process of the present invention are those which are capable of dissolving phosphoric acid but have limited miscibility with water free of phosphoric acid, as well as with water containing phosphoric acid and calcium chloride. The solvents which can be used in the process may be ascertained by reference to data on the mutual miscibility of solvents and water, which is well-known in the art and is available from the literature, e.g., Seidell, Solubilities Of Organic Compounds, 3rd Edition, Volume 2, 1941, D. Van Nostrand Co., Inc., New York City and Landolt-Bornstein, Physikalisch-Chemische Tabellen, 1912, Julius Springer, Berlin, Germany. Representative solvents coming within the above definition are, for example, lower aliphatic alcohols and ketones of limited mutual miscibility with water, such as alcohols containing 4 to 6 carbon atoms in the aliphatic group, used alone or in mixture, e.g., butanol, amyl alcohol, isoamyl alcohol, and also trialkyl phosphates, particularly those containing 2 to 8 carbon atoms in the individual alkyl group, such as tributyl phosphate and mixtures thereof. The contacting of the acidulate liquor with the organic solvent in the extraction step may be effected in any of the standard extraction apparatus employed for similar fluids. The contacting of the acidulate liquor with the selected organic solvent produces an organic phase and an aqueous phase. The organic phase has been found to contain essentially all of the phosphoric acid, hydrochloric acid and hexavalent uranium, which was initially present in the acidulate liquor, in addition to a small portion (up to about 10 weight percent) of the $FeCl_3$ initially present in the acidulate liquor, as well as most of the HCl introduced during the extraction operation. The organic phase containing the phosphoric acid is separated from the extraction apparatus and is processed by known methods to recover the phosphoric acid and the organic solvent therefrom. See, e.g., U.S. Pat. Nos. 2,880,063 and 3,311,450. The recovered organic solvent may be recycled to the extraction step.

A brine raffinate remains following the separation of the phosphoric acid-organic phase. A typical brine raffinate contains:

| | | |
|---|---|---|
| $CaCl_2$ | 26.0 | weight percent |
| HCl | 2.0 | " |
| $FeCl_3$ | 0.7 | " |
| $AlCl_3$ | 0.7 | " |
| F values (as elemental F) | 0.6 | " |
| U values (as elemental U) | 30 | ppm |
| Yttrium values (as elemental Y) | 100 | ppm |
| Lanthanum values (as elemental La) | 20 | ppm |
| Other Rare Earths (as elemental metals) | 40 | ppm (total) |

Due to the marked tendency of uranium in the tetravalent state to remain in the aqueous phase and the tendency of hexavalent uranium to transfer into the organic phase during the extraction step, most of the uranium values present in the brine raffinate are in the tetravalent state following the extraction step. However, during subsequent processing of the brine raffinate, a small amount of the tetravalent uranium may be oxidized to the hexavalent state due to the sensitivity of tetravalent uranium to air oxidation at elevated pH. It should be recognized that the concentration of the above constituents in the brine raffinate and the precise components present in the brine raffinate may vary considerably from that indicated above depending on the composition of the tricalcium phosphate mineral treated by the process of the present invention, the conditions of digestion and the conditions of the extraction step.

An essential feature of the present invention is the addition to the brine raffinate of a basically reacting compound so as to adjust the pH of the raffinate to at least about 9, and preferably from about 9 to 11, in order to effect coprecipitation of substantially all of the fluorine and uranium values and at least 90 percent of the rare earth metal values from the brine raffinate. The basically reacting compounds which may be employed to effect such precipitation are generally selected from the group consisting of alkali hydroxides, alkaline earth hydroxides, alkali carbonates, alkaline earth oxides, alkaline earth carbonates, ammonium hydroxide, alkaline earth silicates and mixtures thereof. Preferred basically reacting compounds are sodium hydroxide, potassium hydroxide, ammonium hydroxide, sodium carbonate, calcium oxide and calcium carbonate.

When calcium carbonate or calcium silicate is employed as the basically reacting compound, a pH of 9 cannot be obtained utilizing the calcium silicate or calcium carbonate alone, and therefore, supplementary addition of another basically reacting compound (as, for example, calcium oxide) is required in order to effect the brine raffinate having a pH of at least about 9.

The selected basic reacting compounds may be added to the brine raffinate either as a solid or as an aqueous solution of the compound, or, in the case of ammonium hydroxide, may be added by bubbling gaseous $NH_3$ through the raffinate. The amount of the basically reacting compound added to the brine raffinate, varies according to the pH of the raffinate, which in turn varies according to the amount of HCl remaining in the brine raffinate after extraction, the relative basicity of the selected basically reacting compound and other factors. In general, the selected basically reacting compound will be added in an amount of from about 2 to 5 weight percent of a brine raffinate containing 26 weight percent $CaCl_2$, 2 weight percent HCl, 0.7 weight percent $FeCl_3$, 0.7 weight percent $AlCl_3$, 0.6 weight percent fluorine values, 30 ppm uranium values and 160 ppm rare earth metal values. Various known sources of the above basically reacting compounds may be employed in the process of the present invention. For example, sea shells and limestone are effective sources of calcium carbonate. In addition, calcium silicate may be used in the form of spent bed sand discharged from a fluidized bed pyrohydrolizer unit which may be used for recovery of HCl from the basic solution containing $CaCl_2$, as discussed below.

The temperature of the brine raffinate to which the selected basically reacting compound is added is not critical, but is preferably below the boiling point of the brine raffinate, which is generally from about 105° to 110°C. To effect substantially complete precipitation of the fluorine, uranium and rare earth metal values of the brine raffinate and to increase the rate at which the fluorine, uranium and rare earth metal values are precipitated, the brine raffinate may be agitated (as by use of a mechanical stirrer) in the presence of the selected basically reacting compound. Such agitation is, however, not essential.

The period of time required to effect precipitation of substantially all of the fluorine and uranium values and at least 90 percent of the rare earth metal values from the brine raffinate varies according to the relative amounts of these values initially present in the brine raffinate, the selected basically reacting compound added to the brine raffinate and other factors.

The precipitated solids, obtained by the addition to the brine raffinate of the basically reacting compounds as discussed above, generally contain from about 95 to 100 percent of the uranium values (as elemental uranium), 95 to 100 percent of the fluorine values (as elemental fluorine), and 90 to 100 percent of the rare earth metal values (as elemental rare earth metals) which were initially present in the brine raffinate. In addition, the precipitated solids also contain up to approximately 100 percent of the aluminum and 100 percent of the iron values present in the brine raffinate. The fluorine values in the precipitate are thought to be in the form of calcium fluoride, and the aluminum to be present as a complex compound of the formula $Al_2O_3 \cdot CaCl_2 \cdot 3CaO \cdot 10H_2O$. The form which the uranium and rare earth metal values take in the precipitated solids has not been established with certainty, but is believed that such elements are present as hydrous uranium oxides, calcium uranate, and rare earth metal hydrous oxides, which may contain uranium in both the hexavalent and tetravalent states due to the sensitivity of tetravalent uranium to oxidation.

The precipitated solids obtained by the addition to the brine raffinate of the selected basically reacting compound as discussed above may be separated from the aqueous solution, herein termed the "basic solution," by any standard solid separation procedure, such as by filtration, centrifuging or by decanting the aqueous basic solution. The separated solids may then be processed by known methods to individually recover the fluorine, uranium and rare earth metal values present in the precipitated solids. For example, if the precipitated solids are slurried with a solution of HCl, all the components of the mixture are leached out with the exception of calcium fluoride precipitate, thus isolating the fluorine values. The leach liquor from the above treatment for isolating $CaF_2$ contains uranium and rare earth metal values which may be concentrated or isolated by a number of methods. For example, the liquor may be concentrated by evaporation and the uranium values recovered by adsorption on an anion exchange resin according to the process of U.S. Pat. No. 2,770,520. The rare earth metal values in the effluent from the exchange resin treatment can then be isolated by known methods such as the solvent extraction method set forth in Chemical and Nuclear Technology (S. Peterson and R. Wymer, ed., Addison-Wesley Publishing Co., 1963) p. 359, wherein the rare earth values present in the effluent are extracted therefrom as rare earth chlorides by use of di-2-ethylhexyl phosphoric acid, yielding an aqueous phase containing $CaCl_2$ and $AlCl_3$ which may then be recycled to the digest solution for the process of the present invention to provide a source for an aluminum-containing compound which is soluble in the digest solution.

The basic solution containing $CaCl_2$ which is produced by the addition to the brine raffinate of the selected basically reacting compound as discussed above, may be calcined by known methods to produce hydrochloric acid which may then be recycled to the digestion step for admixture with additional tricalcium phosphate mineral. In addition, the basic solution may be passed through a fluidized bed pyrohydrolysis unit to recover hydrochloric acid. Since spent bed sand may from such a unit contain calcium silicate, it is employed as the basically reacting compound added to the brine raffinate, as discussed above.

As indicated above, an aluminum-containing compound which is soluble in the digest solution may be added to the digest solution during the digestion of the calcium phosphate mineral in order to increase the portion of the fluorine values present in the mineral which dissolves in the digest solution. Aluminum-containing compounds which are especially preferred are $AlCl_3$, $Al(OH)_3$ and $Al_2(SO_4)_3$ and mixtures thereof. The selected aluminum-containing compound should be added to the digest solution in an amount of from about 2 to 5 weight percent of the tricalcium phosphate mineral to be digested, and may be added as a solid or as an aqueous solution. The concentration of aluminum-containing compound in the aqueous solution is not critical and generally ranges from about 10 to 30 weight percent aluminum-containing compound.

As disclosed and claimed in U.S. Pat. No. 3,880,980 (issued Apr. 29, 1975) the amount of uranium which transfers from the acidulate liquor into the brine raffinate may be increased by treating the aqueous acidulate liquor (before the extraction thereof with the organic solvent) with a reductant, such as $H_2S$, to reduce the hexavalent uranium present in the acidulate liquor to the tetravalent state. Since uranium in the tetravalent state transfers into the aqueous phase more readily than does hexavalent uranium, a more complete transfer of uranium into the aqueous phase during extraction is effected, thereby allowing an increased recovery by the process of the present invention of uranium initially present in the tricalcium phosphate mineral.

Referring to the drawing, wherein a process of the present invention is diagrammatically illustrated, tricalcium phosphate mineral, e.g., phosphate rock, containing 2 weight percent fluorine, 50 ppm uranium and 0.1 weight percent rare earth metal values, is introduced through line 13 into reactor 12 wherein the mineral is digested with hydrochloric acid, e.g., a 25 weight percent solution of HCl, introduced through line 10. An aluminum-containing compound, soluble in the digest solution, e.g., an aqueous solution comprising 30 weight percent of $AlCl_3$, may be optionally introduced into reactor 12 through line 11. The digest solution is withdrawn from reactor 12 through line 14 and waste solids removed from the solution in separator 15 and discarded from the system through line 35. The remaining solution, i.e., the acidulate liquor, is passed from separator 15 via line 16 to solvent extraction column 22 wherein the acidulate liquor is admixed with a suitable organic solvent, e.g., butanol, which is introduced into column 22 via line 17, thereby forming organic phase 23 and aqueous phase 25. Organic phase 23 is withdrawn from extraction column 22 via line 24 and is treated by known processes to recover phosphoric acid therefrom.

Aqueous phase 25, i.e., the brine raffinate, is withdrawn from extraction apparatus 22 via line 26 and passed to vessel 28 into which a basically reacting compound, e.g., a mixture of finely ground calcium carbonate and calcium oxide, is introduced through line 27 to form solution having a pH of at least about 9 and to simultaneously precipitate solids containing fluorine, uranium and rare earth metal values. The basic solution and solids are withdrawn from vessel 28 via line 29 and passed to separator 30 wherein the solids are separated from the aqueous solution containing $CaCl_2$. The separated solids are removed from separator 30 via line 32 and may then be treated by known processes to recover the uranium, fluorine and rare earth metal values therefrom. Following the separation of the above solids therefrom, the $CaCl_2$ solution may then be withdrawn from separator 30 via line 31 and may be further treated by known methods to recover HCl therefrom. The recovered HCl may be recycled to line 10 for admixture with additional tricalcium phosphate mineral.

The process of the present invention may be further illustrated by reference to the following examples, wherein parts are by weight unless otherwise indicated.

EXAMPLE 1

2000 Parts of a brine raffinate containing:

| | | |
|---|---|---|
| $CaCl_2$ | 25.7 | weight percent |
| HCl | 1.8 | " |
| $FeCl_3$ | 0.75 | " |
| $AlCl_3$ | 0.62 | " |
| F values (as elemental F) | 0.63 | " |
| U values (as elemental U) | 70 | ppm |
| Yttrium values (as elemental Y) | 100 | ppm |
| Lanthanum values (as elemental La) | 20 | ppm |
| Other Rare Earths (as elemental metals) | 40 | ppm (total) | is obtained as a by-product from the production of phosphoric acid by the hydrochloric acid decomposition of a tricalcium phosphate mineral. With continual vigorous stirring, 70 parts of ground clam shells containing 97.2 weight percent $CaCO_3$ is added to the brine raffinate over a period of 20 minutes. Subsequently, 10 parts of powdered slaked lime, containing greater than 98 weight percent Ca(OH)$_2$, is added to the raffinate, thereby effecting a pH of 9. The mixture is maintained at 70°C. for 3 hours with continuous agitation, during which period a precipitate is formed. At the conclusion of the 3-hour period the precipitate is separated from the basic solution by filtration, drained by suction and dried in an oven at 120°C., yielding 97 parts of solids which are found by chemical analysis to contain:

| | | |
|---|---|---|
| F values (as elemental F) | 12.8 | weight percent |
| U values (as elemental U) | 0.14 | " |
| Rare earth metal values (as the elemental metals) | 0.3 | " |
| Fe values (as Fe$_2$O$_3$) | 7.6 | " |
| Al values (as Al$_2$O$_3$) | 4.8 | " |
| CaCO$_3$ | 25. | " |

Thus, about 98 percent of the fluorine, 97 percent of the uranium and 90 percent of the rare earth metal values present in the brine raffinate are precipitated. Analysis of the precipitated solids by X-ray diffraction shows the fluorine values to be in the form of CaF$_2$ and a substantial amount of the aluminum to be in the form of Al$_2$O$_3$.CaCl$_2$.3CaO.10H$_2$O.

EXAMPLE 2

2000 Parts of brine raffinate having the composition shown in Example 1 is heated to 70°C. and contacted with gaseous ammonia which is bubbled through the continuously stirred brine raffinate. A total of 25 parts of ammonia is passed into the solution over a period of about 2 hours. At periodic intervals, samples of the reaction mixture are withdrawn for pH measurement and chemical analysis to determine the fluorine and uranium values (as elemental fluorine and uranium, respectively) and rare earth metal values (as mixed oxides).

After 17.4 parts of NH$_3$ have been added to the 2000 parts of brine raffinate, the pH of the raffinate is determined to be 7.5 and the percent of the rare earth metal values present in the raffinate which are precipitated is determined to be 60 percent. Approximately 100 percent of the fluorine and uranium values and 92 percent of the rare earth metal values are determined to be precipitated at a pH of 8.4 which corresponds to the addition to the 2000 parts of brine raffinate of 20.0 parts of NH$_3$. The addition to the 2000 parts of brine raffinate of 22.2 parts of NH$_3$ is determined to effect a pH of 9.1 and the precipitation of 100 percent of the rare earth metal values, in addition, to 100 percent of the fluorine and uranium values, present in the brine raffinate.

EXAMPLE 3

2000 Parts of brine raffinate having the composition shown in Example 1 is heated to 70°C. and continuously stirred while 71.5 parts of ground oyster shells containing 96.5 weight percent CaCO$_3$ are added to the raffinate over a period of 4 hours. At periodic intervals, samples of the mixture are withdrawn for chemical analysis.

The following data are obtained.

| Parts Oyster Shells Added | Percent F Precipitated |
|---|---|
| 22.6 | 63 |
| 27.0 | 75 |
| 31.7 | 82 |
| 36.9 | 87 |
| 47.0 | 90 |
| 58.4 | 96 |
| 71.5 | 98 |

After the last addition of oyster shells, the solids are precipitated by filtration and dried at 100°C., yielding 92 parts of material which contained 13.2 percent by weight fluorine.

EXAMPLE 4

1000 Parts of brine raffinate having the composition of Example 1 is heated to 70°C. and stirred continuously while 100 parts of an aqueous solution containing 30 parts of NaOH are added at a uniform rate over a period of 1 hour. The mixture is allowed to react for an additional hour at 70°C., and the solids are then separated from the mixture by filtration and dried at 100°C., yielding 27.5 parts of solids containing 21.8 percent be weight fluorine, corresponding to a recovery of about 95 percent of the fluorine initially present in the brine raffinate. X-ray diffraction analysis indicated that the major component of the solid is CaF$_2$.

EXAMPLE 5

The following example illustrates the effect of adding an aluminum-containing compound to the hydrochloric acid digest solution which is soluble in that solution.

Three 100 part portions of a ground Florida phosphate rock containing:

| | | |
|---|---|---|
| Ca values (as CaO) | 45 | weight percent |
| P values (as P$_2$O$_5$) | 30.2 | " |
| F values (as elemental F) | 3.5 | " |
| SiO$_2$ | 7.62 | " |
| Al$_2$O$_3$ | 0.85 | " |
| Fe$_2$O$_3$ | 1.30 | " |
| U values (as elemental U) | 270 | ppm |
| Rare earth metal values (as the elemental metals) | 650 | ppm | are digested for 2 hours at a temperature of 100°C. The first 100 part portion of the rock is digested with 270 parts of an aqueous hydrochloric acid solution containing 23 weight percent HCl. The second 100 part portion of rock is digested with 270 parts of a 23 weight percent HCl solution and 4.0 parts AlCl$_3$.6H$_2$O, and the third 100 part portion is digested with 270 parts of a 23 weight percent HCl solution and 8.0 parts of AlCl$_3$.6H$_2$O.

Each digest liquor is filtered to yield about 330 parts of a clear acidulate liquor. Upon analysis, each of the acidualte liquors is found to contain the following components in the amounts indicated:

| | | |
|---|---|---|
| CaCl$_2$ | 27.0 | weight percent |
| H$_3$PO$_4$ | 12.6 | " |
| FeCl$_3$ | 0.8 | " |
| U values (as elemental U) | 75 | ppm |
| Rare Earth Metal Values | 185 | ppm |
| HCl | 2.0 | weight percent |

The acidulate liquors, however, differ in composition in fluorine and aluminum content. The acidulate liquor obtained from the first 100 part rock portion to which no aluminum-containing compound is added during digestion is found to contain 0.58 weight percent fluorine values (as elemental F) and 0.67 weight percent Al (as $AlCl_3$). The acidulate liquor obtained following the digestion of the 100 part rock portion to which 4.0 parts $AlCl_3.6H_2O$ is added during digestion is found to contain 0.8 weight percent fluorine and 1.34 weight percent Al (as $AlCl_3$). The acidulate liquor which is obtained from the third 100 part rock portion, to which 8.0 parts $AlCl_3.6H_2O$. is added during digestion, is found to contain 0.92 weight percent fluorine and 2.01 weight percent Al (as $AlCl_3$).

Thus, the addition to the second and third 100 part rock portions of 4.0 parts and 8.0 parts, respectively, of $AlCl_3.6H_2O$, effected a transfer to the acidulate liquor of 76 percent and 87 percent, respectively, of the total fluorine content of the rock, as compared with a transfer to the acidulate liquor of only 55 percent of the fluorine present in first 100 part rock portion to which no aluminum-containing compound was added during digestion.

Although certain preferred embodiments of the invention have been disclosed for purpose of illustration, it will be evident to one skilled in the art that various changes and modifications may be made therein without departing from the scope and spirit of the invention.

We claim:

1. A process for simultaneous recovery of fluorine, uranium and rare earth metal values from a tricalcium phosphate mineral containing same, which comprises:
   a. contacting said mineral with hydrochloric acid to digest said mineral, thereby forming (1) a digest solution containing phosphoric acid, calcium chloride, fluorine, uranium and rare earth metal values and (2) an insoluble residue;
   b. separating said insoluble residue from said digest solution;
   c. contacting said separated digest solution with an organic solvent capable of dissolving phosphoric acid but having limited miscibility with water free of phosphoric acid, thereby forming an organic phase containing phosphoric acid and an aqueous phase containing calcium chloride and fluorine, uranium and rare earth metal values;
   d. separating said organic phase from said aqueous phase;
   e. admixing said separated aqueous phase with an amount of a basically reacting compound sufficient to effect a pH of at least about 9, thereby forming:
      1. a basic solution containing calcium chloride and
      2. precipitated solids containing fluorine, uranium and rare earth metal values; and
   f. separating the precipitated solids containing fluorine, uranium and rare earth metal values from said basic solution.

2. A process according to claim 1 wherein said tricalcium phosphate mineral is apatite.

3. A process according to claim 1 wherein the basically reacting compound is added in an amount sufficient to effect a pH of about 9 to 11.

4. A process according to claim 1 wherein said basically reacting compound is selected from the group consisting of alkali hydroxides, alkaline earth hydroxides, alkali carbonates, alkaline earth carbonates, ammonium hydroxide, alkaline earth silicates, alkaline earth oxides and mixtures thereof.

5. A process according to claim 1 wherein said basically reacting compound is selected from the group consisting of alkali hydroxide, alkaline earth carbonate, alkaline earth oxide, and mixtures thereof and wherein the basically reacting compound is added in an amount sufficient to effect a pH of about 9 to 11.

6. A process according to claim 1 wherein said separated digest solution is treated to reduce the hexavalent uranium content thereof to the tetravalent state prior to contacting said separated digest solution with said organic solvent.

7. A process according to claim 1 wherein an aluminum-containing compound soluble in said digest solution is admixed with said digest solution.

8. A process according to claim 7 wherein said aluminum-containing compound is selected from the group consisting of $AlCl_3$, $Al(OH)_3$, $Al_2(SO_4)_3$ and mixtures thereof.

9. A process according to claim 5 wherein said mineral is contacted with said hydrochloric acid at a temperature of not greater than about 110°C.

* * * * *